(12) United States Patent
Daraselia

(10) Patent No.: US 9,779,083 B2
(45) Date of Patent: *Oct. 3, 2017

(54) FUNCTIONING OF A COMPUTING DEVICE BY A NATURAL LANGUAGE PROCESSING METHOD COMPRISING ANALYSIS OF SENTENCES BY CLAUSE TYPES

(71) Applicant: Elsevier, Inc., New York, NY (US)

(72) Inventor: Nikolai Daraselia, Germantown, MD (US)

(73) Assignee: ELSEVIER, INC., New York, NY (US)

(*) Notice: Subject to any disclaimer, the term of this patent is extended or adjusted under 35 U.S.C. 154(b) by 82 days.

This patent is subject to a terminal disclaimer.

(21) Appl. No.: 15/017,178

(22) Filed: Feb. 5, 2016

(65) Prior Publication Data
US 2016/0154790 A1 Jun. 2, 2016

Related U.S. Application Data

(63) Continuation-in-part of application No. 14/256,330, filed on Apr. 18, 2014, now abandoned, which is a
(Continued)

(51) Int. Cl.
*G06F 17/27* (2006.01)
*G06F 17/20* (2006.01)
(Continued)

(52) U.S. Cl.
CPC ...... *G06F 17/2775* (2013.01); *G06F 17/2785* (2013.01); *G06F 17/30616* (2013.01); *G06F 9/4448* (2013.01); *G06F 17/2872* (2013.01)

(58) Field of Classification Search
CPC . G06F 17/2785; G06F 9/4448; G06F 17/2872
(Continued)

(56) References Cited

U.S. PATENT DOCUMENTS 4,773,009 A 9/1988 Kucera et al.
4,864,502 A 9/1989 Kucera et al.
(Continued)

*Primary Examiner* — Farzad Kazeminezhad
(74) *Attorney, Agent, or Firm* — Dinsmore & Shohl LLP

(57) ABSTRACT

Systems and methods for converting a natural language sentence into a computer-readable primitive sentence and extracting information therefrom are disclosed. A method includes identifying, by a processing device, a verbal block in the natural language sentence, splitting, by the processing device, the natural language sentence into one or more logical clauses, determining, by the processing device, a type for each logical clause, where the type indicates whether each logical clause contains an ambiguous verbal block, disambiguating, by the processing device, the ambiguous verbal block within each logical clause, where each verbal block is considered independently of a noun phrase, and constructing, by the processing device, the computer-readable primitive sentence for each ambiguous verbal block by duplicating a shared noun phrase of the ambiguous verbal block. The computer-readable primitive sentence improves functioning of a computing device by allowing the computing device to process the natural language sentence to obtain information therefrom.

20 Claims, 2 Drawing Sheets

Related U.S. Application Data continuation of application No. 11/898,952, filed on Sep. 18, 2007, now Pat. No. 8,706,476.

(51) Int. Cl.
*G06F 17/28* (2006.01)
*G06F 17/30* (2006.01)
*G06F 9/44* (2006.01)

(58) Field of Classification Search
USPC .................................................. 704/9, 8, 4
See application file for complete search history.

(56) References Cited

U.S. PATENT DOCUMENTS

| | | | |
|---|---|---|---|
| 4,868,750 A | | 9/1989 | Kucera et al. |
| 6,138,087 A | * | 10/2000 | Budzinski ............... G06F 17/27 704/9 |
| 2007/0022105 A1 | | 1/2007 | Roux |

* cited by examiner

FUNCTIONING OF A COMPUTING DEVICE BY A NATURAL LANGUAGE PROCESSING METHOD COMPRISING ANALYSIS OF SENTENCES BY CLAUSE TYPES

CROSS-REFERENCE TO RELATED APPLICATIONS

This application is a continuation-in-part of U.S. patent application Ser. No. 14/256,330, entitled "NATURAL LANGUAGE PROCESSING METHOD," filed on Apr. 18, 2014, which is a continuation of U.S. patent application Ser. No. 11/898,952, entitled "NATURAL LANGUAGE PROCESSING METHOD," Filed on Sep. 18, 2007, now U.S. Pat. No. 8,706,476, the entire disclosures of which are hereby incorporated by reference herein.

BACKGROUND

Field

The present disclosure relates generally to the fields of natural language processing and information extraction. More particularly, the present disclosure provides systems and methods for converting complex natural language sentences into simple structures, so that information can be extracted efficiently using regular expression-like patterns.

Technical Background

In our age of information explosion, thousands and thousands of journal articles, scientific papers, and other kinds of written documents are generated every day. A particular person may be interested in certain information contained in at least some of these documents, but lack the capacity to read the documents and extract the information of interest.

Computing systems may be used to input the information from these written documents, and then parse the documents to catalog their contents so that a user can search for information of interest. However, the written documents are provided in natural language, which is difficult for a computing device to process without first converting the natural language into an acceptable computer-readable format. Such a conversion may be referred to as Natural Language Processing (NLP). Existing NLP approaches may rely on grammar to construct semantic trees. Such an approach makes it necessary to create and maintain complete grammar of a language, which is a cumbersome task. As such, existing NLP approaches are cumbersome, time consuming, and require significant processing power. In addition, existing NLP approaches require large databases to store the semantic trees that maintain the complete grammar of the language.

Accordingly, a need exists for methods and systems that can process natural language sentences and extract information therefrom accurately and efficiently without requiring cumbersome, time consuming, and processing-intensive tasks that require an excessive amount of storage space.

SUMMARY

In one embodiment, a method for converting a natural language sentence into a computer-readable primitive sentence includes identifying, by a processing device, a verbal block in the natural language sentence, splitting, by the processing device, the natural language sentence into one or more logical clauses, and determining, by the processing device, a type for each of the one or more logical clauses. The type indicates whether each of the one or more logical clauses contains an ambiguous verbal block. The method further includes disambiguating, by the processing device, the ambiguous verbal block within each of the one or more logical clauses, where each verbal block is considered independently of a noun phrase and constructing, by the processing device, the computer-readable primitive sentence for each ambiguous verbal block by duplicating a shared noun phrase of the ambiguous verbal block. The computer-readable primitive sentence improves a functioning of a computing device by allowing the computing device to process the natural language sentence to obtain information from the natural language sentence.

In another embodiment, a method for extracting information from a natural language sentence includes converting, by a processing device, the natural language sentence into a computer-readable primitive sentence by detecting one or more logical clauses in the natural language sentence. The computer-readable primitive sentence improves a functioning of a computing device by allowing the computing device to process the natural language sentence to obtain information from the natural language sentence. The method further includes determining, by the processing device, a type for each of the one or more logical clauses, where the type indicates whether each of the one or more logical clauses contains an ambiguous verbal block and extracting, by the processing device, information using from the computer-readable primitive sentence based on the type for each of the one or more logical clauses.

In yet another embodiment, a system for converting a natural language sentence into a computer-readable primitive sentence includes a processing device and a non-transitory, processor-readable storage medium. The non-transitory, processor-readable storage medium includes one or more programming instructions that, when executed, cause the processing device to identify a verbal block in the natural language sentence, split the natural language sentence into one or more logical clauses, and determine a type for each of the one or more logical clauses. The type indicates whether each of the one or more logical clauses contains an ambiguous verbal block. The non-transitory, processor-readable storage medium further includes one or more programming instructions that, when executed, cause the processing device to disambiguate the ambiguous verbal block within each of the one or more logical clauses, where each verbal block is considered independently of a noun phrase and construct the computer-readable primitive sentence for each ambiguous verbal block by duplicating a shared noun phrase of the ambiguous verbal block. The computer-readable primitive sentence improves a functioning of a computing device by allowing the computing device to process the natural language sentence to obtain information from the natural language sentence.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
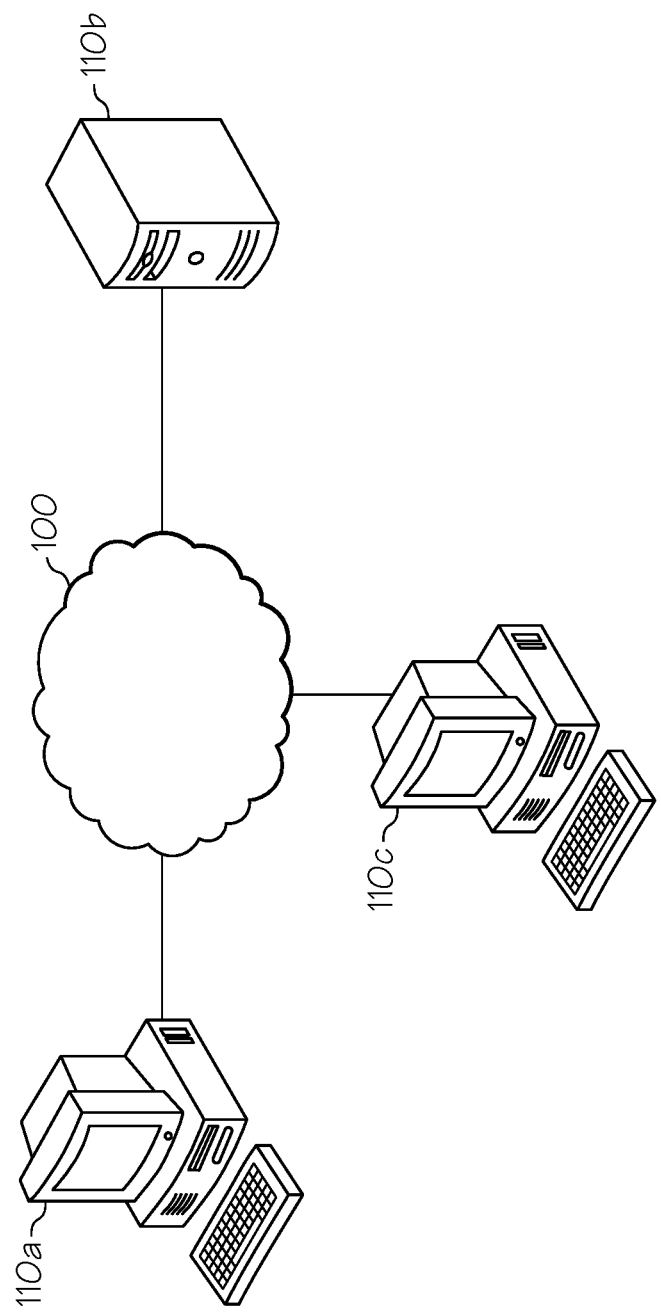
FIG. 1 schematically depicts an illustrative computing network for a system for converting a natural language sentence into a computer-readable primitive sentence according to one or more embodiments shown and described herein.

The present disclosure provides methods and systems that can process natural language sentences into a format that is computer readable, thereby improving the functionality of a computing device embodying the methods and systems, and extract information from the sentences accurately and efficiently. The present disclosure provides a method for converting a natural language sentence into a set of primitive sentences. This is achieved by first identifying verbal blocks in the sentence and splitting the sentence into a set of subordinate and/or coordinate logical clauses. In addition, ambiguous verbal blocks within each logical clause are disambiguated. Finally, a primitive sentence is constructed for each verbal block by duplicating the shared noun phrases of verbal blocks. In a specific embodiment, information is extracted from each of the resulting primitive sentences using simple regular expression-like word patterns.

The present disclosure provides new approaches to parsing and deconstructing natural language sentences into smaller units that are more easily readable and proces sable by a computing device for information extraction. In one embodiment, the present disclosure provides a method for converting a natural language sentence into a set of primitive sentences. A primitive sentence is a sentence that is easier for a computing device to process than a natural language sentence, containing exactly one relation, expressed by a verbal block, between two or more noun phrases. For example, the sentence "We have shown that A, which inhibits B, activates and phosphorylates C" contains the following primitive sentences: "A inhibits B", "A activates C" and "A phosphorylates C." A more complex sentence: "In many cases, A, which was shown to inhibit B, also activates C, suggesting that A phosphorylates E" contains the following primitive sentences: "A was shown to inhibit B", "A activates C", "A phosphorylates E". Primitive sentences are to the great extent syntactically normalized and can be directly used to accurately extract information by pattern-based approaches (approaches relying on detection of the specific sequences of words in the sentence).

One example of a written document may be a document containing information relating to biological research regarding the living cell. The living cell is a complex machine that depends on the proper functioning of its numerous parts, including proteins. Information about protein function and cellular pathways is central to the system-level understanding of a living organism. However, the collective knowledge about protein functions and pathways is scattered throughout numerous publications in scientific journals. Although a number of available databases cover different aspects of protein function, these databases depend on human experts to input data. As a result, these databases rarely store more than a few thousands of the best-known protein relationships and do not contain the most recently discovered facts and experimental details. While the number of new publications in this field grows rapidly, bringing the relevant information together becomes a bottleneck in the research and discovery process. There is, therefore, an urgent need for an automated system capable of accurately extracting information regarding protein function and cellular pathway from available literature. Moreover, such a system can find application in numerous fields other than biological research.

Conventional approaches aimed at solving this problem range from simple statistical methods to advanced NLP techniques. For example, in the context of biological research, one simple way to extract protein function information is to detect the co-occurrence of protein names in a text. However, by its nature, the name co-occurrence detection yields very little or no information about the type of a described relation and, therefore, the co-occurrence data may be misleading.

Another information extraction approaches rely on the matching of pre-specified templates (i.e., patterns) or rules (e.g., precedence/following rules of specific words). The underlying assumption is that sentences conforming exactly to a pattern or a rule express the predefined relationships between the sentence entities. In some cases, these rules and patterns are augmented with additional restrictions based on syntactic categories and word forms in order to achieve better matching precision. One major shortcoming of this approach is that various syntactic constructs have to be explicitly encoded in the rules and that the number of such rules required for practical information extraction is large. In addition, relationships expressed as coordinated clauses or verbal phrase conjunctions in a sentence cannot be captured.

Yet another approach utilizes shallow parsing techniques to process natural language sentences and extract information. Unlike word based pattern matchers, shallow parsers perform partial decomposition of a sentence structure. They identify certain phrasal components and extract local dependencies between them without reconstructing the structure of an entire sentence. Shallow parsers also rely on usage of regular expressions over the syntactic tags of the sentence lexemes to detect specific syntactic constructs (noun phrases or verb phrases). The downfall of shallow parsing is its inability to account for the global sentence context as well as the inability to capture long range syntactic dependencies. The precision and recall rates reported for shallow parsing approaches are 50-80% and 30-70%, respectively.

Another approach is based on full sentence parsing. This approach deals with the structure of an entire sentence, and, therefore, is potentially more accurate. One example of this approach is a semantic grammar-based system, which requires complete redesign of the grammar in order to be tuned to a different domain. Another example of this approach uses a modular architecture that separates NLP and information extraction into different modules. In this two-step information extraction system, the first step is the construction of the sentence argument structure using general-purpose domain independent parsers. The second step is domain-specific frame extraction.

Conventional full sentence NLP based information extraction approaches suffers from several problems. One problem is efficiency, relating to an intermediate step during the processing of a natural language sentence. This intermediate step involves the construction of a semantic tree of the sentence. A semantic tree is represented by a directed acyclic graph (DAG)-data structures consisting of sentence lexemes which are connected with labeled vertices. A label on a vertex indicates the logical relation between words. Syntactic variations can be reduced to a single semantic tree for efficient information extraction. (For example, the following sentences: "A inhibits B", "B is inhibited by A", "A was shown to inhibit B", "B inhibitor A", "inhibition of B by A", "A by which B is inhibited", and so on, are represented by a single semantic tree: inhibit{agent, A, what, B}, where "inhibit", "A", and "B" are sentence lexemes, and "agent" and "what" are semantic labels of A and B in the parent lexeme "inhibit"). Because of the complexities and ambiguities of the natural language, numerous semantic trees with different structures may result from a single sentence, each of which has to be processed to extract information. This results in inefficiency.

The present disclosure provides a solution to the above-mentioned issues by converting a natural language sentence into a format that is computer readable. Such a conversion is not as processor-intensive as the NLP methods described above, is more efficient because of the simplicity in converting sentences, and does not require voluminous storage space for storing semantic trees and other data related solely to the conversion process.

Referring now to the figures, FIG. 1 shows an illustrative computing network that depicts components for a system of converting natural language sentences into a computer-readable primitive sentence. As illustrated in FIG. 1, a computer network 100 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 100 may generally be configured to electronically connect one or more computing devices and/or components thereof. Illustrative computing devices may include, but are not limited to, a user computing device 110a, a server computing device 110b, and an administrator computing device 110c.

The user computing device 110a may generally be used as an interface between a user and the other components connected to the computer network 100. Thus, the user computing device 110a may be used to perform one or more user-facing functions, such as receiving one or more inputs from a user or providing information to the user, as described in greater detail herein. In some embodiments, the user computing device 110a may contain one or more software programs and/or the like for searching documents once the natural language sentence has been converted to a computer-readable primitive form.

Additionally, included in FIG. 1 is the administrator computing device 110c. In the event that the server computing device 110b requires oversight, updating, or correction, the administrator computing device 110c may be configured to provide the desired oversight, updating, and/or correction. The administrator computing device 110c may also be used to input additional data into a corpus stored on the server computing device 110b.

The server computing device 110b may receive data from one or more sources (e.g., written documents from journal databases and/or the like), process the data (e.g., convert natural language sentences into computer-readable primitive sentences), store the data, and/or provide data to one or more recipients, such as the user computing device 110a.

It should be understood that while the user computing device 110a and the administrator computing device 110c are depicted as personal computers and the server computing device 110b is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 110a, server computing device 110b, and administrator computing device 110c may represent a plurality of computers, servers, databases, components, and/or the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 2:
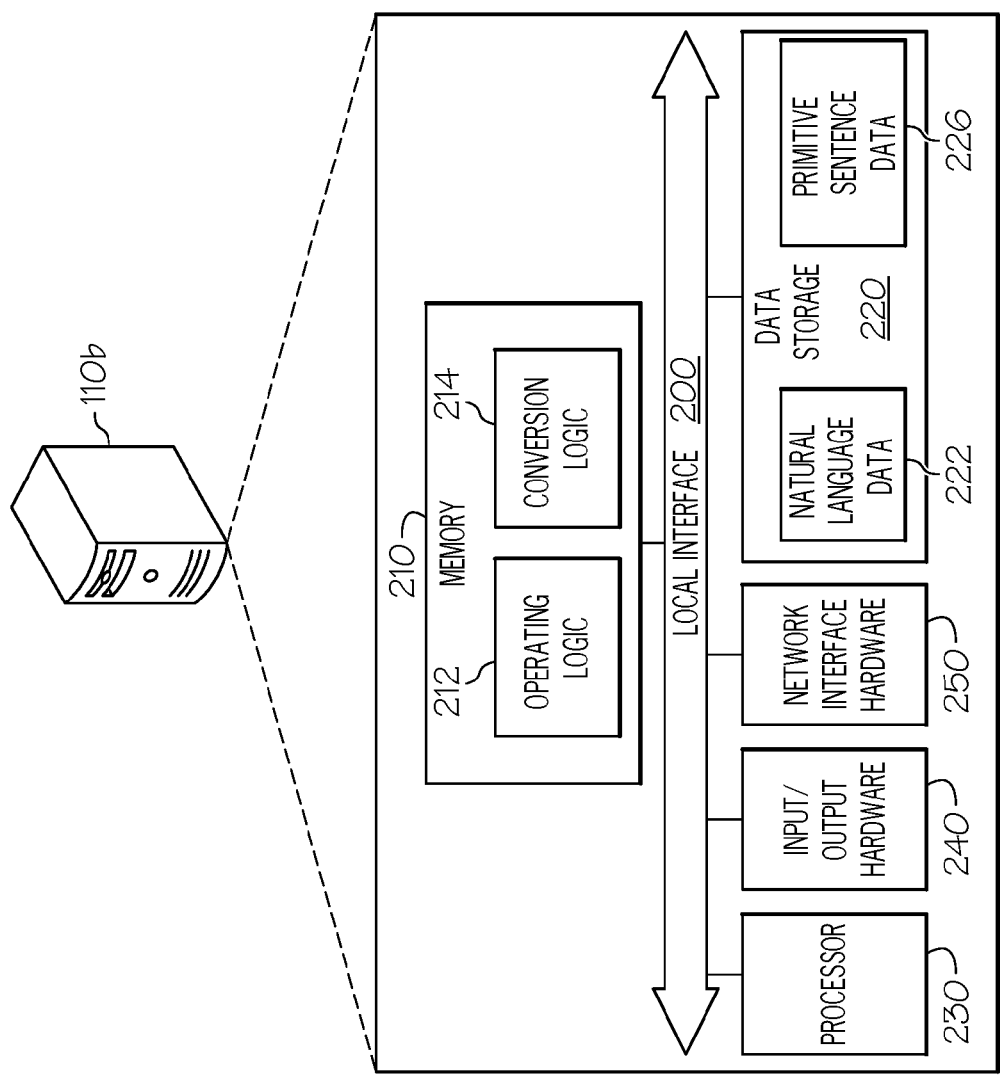
FIG. 2 schematically depicts a computing device from FIG. 1, further illustrating hardware that may be used in converting a natural language sentence according to one or more embodiments shown and described herein.

FIG. 2 depicts the server computing device 110b from FIG. 1, further illustrating a system for receiving data from one or more sources, processing the data, storing the data, and/or providing the data to one or more recipients. Particularly, the server computing device 110b may include a non-transitory computer-readable medium for converting natural language sentences into primitive sentences and/or extracting information therefrom, according to embodiments shown and described herein. While in some embodiments the server computing device 110b may be configured as a general purpose computer with the requisite hardware, software, and/or firmware, in some embodiments, the server computing device 110b may also be configured as a special purpose computer designed specifically for performing the functionality described herein.

As also illustrated in FIG. 2, the server computing device 110b may include a processing device 230, input/output hardware 240, network interface hardware 250, a data storage component 220 (which may store natural language data 222 and primitive sentence data 226), and a non-transitory memory component 210. The memory component 210 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 210 may be configured to store operating logic 212 and conversion logic 214 (each of which may be embodied as a computer program, firmware, or hardware, as an example). A local interface 200 is also included in FIG. 2 and may be implemented as a bus or other interface to facilitate communication among the components of the server computing device 110b.

The processing device 230 may include any processing component configured to receive and execute instructions (such as from the data storage component 220 and/or memory component 210). The input/output hardware 240 may include a monitor, keyboard, mouse, printer, camera, microphone, speaker, touch-screen, and/or other device for receiving, sending, and/or presenting data. The network interface hardware 250 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 220 may reside local to and/or remote from the server computing device 110b and may be configured to store one or more pieces of data and provide access to the one or more pieces of data. As illustrated in FIG. 2, the data storage component 220 may store natural language data 222 and primitive sentence data 224 converted from the natural language data 222, as described in greater detail herein.

Included in the memory component 210 are the operating logic 212 and the conversion logic 214. The operating logic 212 may include an operating system and/or other software for managing components of the server computing device 110b. The conversion logic 214 may be configured for identifying verbal blocks, splitting natural language sentences into logical clauses, determining a type for each logical clause, disambiguating an ambiguous verbal block, constructing primitive sentences, and extracting information, as described in detail below.

It should be understood that the components illustrated in FIG. 2 are merely illustrative and are not intended to limit the scope of this disclosure. More specifically, while the components in FIG. 2 are illustrated as residing within the server computing device 110b, this is a nonlimiting example. In some embodiments, one or more of the components may reside external to the server computing device 110b. Similarly, while FIG. 2 is directed to the server computing device 110b, other components such as the user computing device 110a and the administrator computing device 110c (FIG. 1) may include similar hardware, software, and/or firmware.

It should also be understood that the components illustrated in both FIGS. 1 and 2 may be used to carry out one or more processes, such as the steps described hereinbelow.

Converting a natural language sentence to a set of smaller units, whether primitive sentences, consists of several steps. First, we identify verbal blocks in a sentence. A verbal block is a sequence of sentence lexemes which encodes a "relation" between subject and object entities expressed in an individual verb phrase. It can be a simple verb, e.g., "inhibit", or more complex verbal constructs, such as "can be inhibited", "was shown to activate", "is suggested to play a role", and so on. A verbal block can also contain adjectives, for example, "is critically important", and nouns, for example, "is target".

Verbal blocks can be identified using a finite state automaton operating on syntactic categories of sentence lexemes. Table 1 is a set of syntactic categories designed for this specific purpose.

TABLE 1

Syntactic Categories

| Category | Description |
|---|---|
| ( | Left bracket |
| ) | Right bracket |
| A | Determiner "a" |
| AND | "and" |
| As | "as" |
| BE | Verb "be" |
| BUT | "but" |
| BUT_NOT | "but not" |
| By | Preposition "by" |
| CCD | adverb |
| CCJ | Sentence conjunctions |
| CCJN | Sentence conjunctions |
| Cdet | Other determiners ("some", "all") |
| COMMA | Comma |
| D | Adverb |
| DASH | "—" |
| DET | determiner |
| E | Past verb form |
| EITHER | "either" |
| Exemp | |
| IF | "if" |
| J | Adjective |
| N | Noun |
| Neg | "not" |
| NEITHER | "neither" |

TABLE 1-continued

Syntactic Categories

| Category | Description |
|---|---|
| NOR | "nor" |
| Of | Preposition "of" |
| OR | "or" |
| prepN | prepositions |
| prepV | prepositions |
| Pron | Pronouns |
| PronPos | Possessive pronouns |
| STOP | period |
| THAN | "than" |
| THAT | "that" |
| To | "to" |
| V | Verb |
| Ving | Pres. Cont. verb |
| WHEN | "when" |
| WHERE | "where" |
| WHFORM | |
| WHICH | "which" |
| WHILE | "while" |

The automaton can be compiled from a set of regular expressions, designed to capture the great majority of all valid English verbal constructs. Verbal blocks can be definitive or ambiguous. The examples of verbal blocks are described in the examples set forth below.

The next task is to split the sentence into a set of subordinate or coordinate logical clauses. This task can be performed before the above mentioned task of identifying verbal blocks. There are several different types of logical clauses:

Main clauses represent the central idea expressed in a sentence. Each sentence may contain one or more (usually no more than two) coordinated central clauses separated by clause conjunctions. For example, sentence "A inhibits B, while C activates D" contains two main clauses separated by clause conjunction "while".

Which/that clauses represent the description of one of the relation entities. For example, sentence "A, which inhibits B, activates D" contains main clause "A activates D" and which/that clause "which inhibits B", which describes entity A.

Apposition clauses serve the same descriptive purpose as a which/that clause, but are syntactically expressed in a different manner and do not contain verbal blocks. In the sentence "A, a B inhibitor, activates C", the phrase "a B inhibitor" is the apposition clause.

V-complement clauses represent statements which are under logical subordination of a main verb. For example, sentence "We have shown that A inhibits B" contains the main clause "we have shown" and a subordinate v-complement clause "A inhibits B". The logical interpretation of the subordinate v-complement clause is completely determined by the meaning of the main verb (compare "we have shown" and "we have failed to prove").

Prepositional modifier clauses provide additional descriptive information about the action or event expressed by the main clause. For example, in the sentence "Under these conditions, A activates B", the phrase "under these conditions" is the prepositional modifier. Notably, they can be easily detected only when they precede the main clause.

Adverbial modifier clauses serve the same purpose as prepositional modifier clauses but are expressed by simple adverbs or adverbial phrases. For example, in the sentence "A, on the other hand, does not activate B", the phrase "on the other hand" is the adverbial modifier.

Conditional clauses express conditional coordination between clauses. For example, in the sentence "A activates B if C inhibits D", the phrase "if C inhibits D" is the conditional clause. Structurally it is similar to the main clause.

To-clauses are subordinate clauses expressing the goal or methods of the action described in the main clause. For example, in the sentence "A activates B to inhibit C", the phrase "to inhibit C" is the to-clause.

As-clauses are coordinate clauses most frequently indicating the discovery method for the statement expressed in the main clause. For example, in the sentence "A activates B, as was shown by PCR analysis", the phrase "as was shown by the PCR analysis" is the as-clause.

By-clauses are subordinate clauses expressing methods of the action defined in the main clause. For example, in the sentence "A activates B by inhibiting D", the phrase "by inhibiting D" is the by-clause.

ING-clause are coordinate clauses usually expressing a statement independent from or loosely logically coupled with the statement in the main clause. For example, in the sentence "A activates B, suggesting D", the phrase "suggesting D" is the ING-clause.

The type of each clause dictates whether it can or cannot contain verbal blocks. The splitting is done by using a set of regular expressions, to detect the borders of each clause, and also a set of simple rules to detect the right-end borders of some clauses.

The next step is the disambiguation of ambiguous verbal blocks within each particular clause. There are three major sources of syntactic ambiguities relevant to the detection of noun phrases and verbal blocks:

past tense of verb, which serves as a verb in past tense or as an adjective. For example, in the sentence "A inhibits activated B", the word "activated" is no longer a verb in past tense (category denoted "E").

present continuous verb form, which can serve as verb, noun or adjective (category denoted "G").

truly ambiguous noun/verb lexemes. For example, "result", "account", etc (category denoted "Vambig").

To perform the disambiguation task, a combination of two different approaches can be used: the local approach (i.e., local disambiguating task) and the global approach (i.e., a global disambiguating task). Local disambiguation, which is well known in the art, is performed by examining the lexemes immediately preceding and following ambiguous one. In some embodiments, a rule-based local disambiguation is used. In a rule-based local disambiguation, the local context is described by a set of regular expression-like rules. Each rule has a left part which encodes an ambiguous category and its immediate syntactic neighborhood and a right part which defines what non-ambiguous category should be used instead of ambiguous one. When the rule is matched over a sentence, an ambiguous category within the rule is replaced with non-ambiguous one suggested by the rule.

Global disambiguation relies on the linguistic properties of the clauses, which dictate, that each clause can contain only one verbal block or a conjunction of verbal blocks. There are two types of verbal conjunctions within each clause—a verbal block conjunction, for example, "A inhibits and phosphorylates B", and verbal phrase conjunction, for example, "A inhibits B and activates D". Accordingly, the core structure of a verbal block containing clause can be expressed by the following regular expression:

NP V((,V)*and|but|or V)?NP((,V NP)*and|but|or V NP)?

where "V" designates verbal block, and "NP" is any non-verbal sequence of lexeme categories, "*" denotes sub-expression repeating 0 or more times, and "?" denotes parenthesized optional sub-expression. The global disambiguation algorithm looks for either type of conjunction and tries to detect at least one non-ambiguous verbal block/phrase. If such a verbal block/phrase is detected the whole conjunction is disambiguated.

After completion of the above tasks, the set of logical clauses is captured and zero or more verbal blocks are identified in each. The information is enough to generate a set of short primitive sentences from the original sentence.

The primitive sentences are constructed by duplicating the shared noun phrases for each of the verbal block conjunctions within each clause and for subordinate clauses. For example, the sentence "We have shown that A, which inhibits B, activates and phosphorylates C" is converted to the following primitive sentences: "A inhibits B", "A activates C", and "A phosphorylates C".

A prototype system incorporating the present disclosure has been developed to process MEDLINE sentences. In the output, each input sentence was partitioned into a linear sequence of individual logical clauses (each of its own type) and within each logical clause the verbal blocks were detected. The preliminary results show that the sentence is correctly split into clauses in .about.95% of all cases. The verbal blocks in clauses are detected with .about.95% accuracy.

The present disclosure has a number of advantages over previous approaches. The first advantage is simplicity. Classical NLP approaches requires the full grammar of the English language, which must encode all valid syntactic constructs and therefore can contain thousands of rules. The approach in this disclosure requires only a small set of regular expressions required for verbal block encoding and clause boundaries encoding, and a much simpler grammar to capture the semantic structure for each clause.

Another advantage is performance. Unlike the grammar-based parsers, which in general have an order of complexity O(n 3), where n the number of sentence lexemes, the approach in this disclosure is linearly dependent on the sentence length, and is thousands of times faster than traditional parsers.

Although the disclosure is first conceived as a method to extract protein interaction and cellular pathway information from biological science journals, it can be utilized across different domains, including, but not limited to business news, commercial press releases, military messages, etc. The primitive sentences can be used for indexing large text corpora in such a manner to allow quick search for relations between phrases and individual words.

EXAMPLES

Existing implementation of the described sentence decomposition algorithm covers all major grammatical phenomena of the English language. Specifically, it can normalize: (1) verbal conjunction; (2) active/passive voice; (3) verbal phrase (VP) conjunctions; (4) noun phrase (NP) conjunctions; (5) NP modifiers; (6) VP modifiers; (7) some syntactic movements; and (8) NP prepositional structure.

The examples described here illustrate the broad grammatical coverage of sentence decomposition algorithm. Each example consists of original sentence followed by a set of derived primitive sentences. The set of sentences are designed to illustrate all major English grammatical phenomena. The identified verbal blocks are colored in red.

Each primitive sentence starts with "#" followed by the type of clause. Only primitive sentences containing domain-specific named entities (proteins, small molecules, etc) are shown.

Mechanistically, we found that ID{1241555=oxalate} works exogenously by blocking generation of ID{1428929=reactive oxygen species} in susceptible plants and reducing ID{4000000,4003443=oxidative damage} generated in response to ID{1221537=catechin}.

VPmod ID{1241555=oxalate} & block susceptible plants ID{1428929=reactive oxygen species} generation

VPmod ID{1241555=oxalate} & reduce ID{4000000, 4003443=oxidative damage}

NPRel ID{1221537=catechin} response generate ID{4000000,4003443=oxidative damage}

Using this approach it was shown that ID{1241583=SNP}, as well as ID{1000000=potassium ferricyanide (Fe(III)CN)} and ID{1000000=potassium ferrocyanide (Fe(II)CN)}, reduced ID{4000000,4005177=dormancy} of *Arabidopsis* seeds by generating ID{1360624=cyanide}(ID{{1360624=CN}).

Main ID{1000000=potassium ferrocyanide (Fe(II)CN)} & reduce *Arabidopsis* seeds ID 14000000,4005177=dormancy}

Main ID{1000000=potassium ferricyanide (Fe(III)CN)} & reduce *Arabidopsis* seeds ID{4000000,4005177=dormancy}

Main ID{1241583=SNP} & reduce *Arabidopsis* seeds ID{4000000,4005177=dormancy}

VPmod ID{11000000=potassium ferrocyanide (Fe(II)CN)} & generate ID{1360624=cyanide} ID{1360624=(CN)}

VPmod ID{1000000=potassium ferricyanide (Fe(III)CN)} & generate ID{1360624=cyanide} ID{1360624=(CN)}

VPmod ID{1241583=SNP} & generate ID{1360624=cyanide} ID{1360624=(CN)}

ID{1230243=Inosinate} formed from ID{1399378=hypoxanthine} was converted into ID{1371589=AMP} and ID{1354177=GMP} which were then catabolized to ID{1415559=adenine} and ID{1220082=guanosine} respectively.

Main ID{1354177=GMP} & convert ID{1230243=Inosinate}

Main ID{1371589=AMP} & convert ID{1230243=Inosinate}

NPmod ID{1220082=guanosine} & catabolize ID{1354177=GMP}

NPmod ID{1415559=adenine} & catabolize ID{1354177=GMP}

NPmod ID{1220082=guanosine} & catabolize ID{1371589=AMP}

NPmod ID{1415559=adenine} & catabolize ID{1371589=AMP}

NPRel ID{1399378=hypoxanthine} & form ID{1230243=Inosinate}

Sequencing of the 3'RACE products indicated that ID{611385=SiP1}, ID{611387=SiP2} and ID{610693=HaP1} encoded ID{12104295=trypsin}-like ID{12003285=serine proteinases}, while ID{819738=HaP2} encoded a chymotrypsin-like ID{12003285=serine proteinases}.

Main ID{0,610693,611385,611387=SiP1, SiP2 and HaP1} & encode ID{12003285=serine proteinases}

Main ID{819738=HaP2} & encode chymotrypsin-like ID{12003285=serine proteinases}

Mechanistically, we found that ID{1241555=oxalate} works exogenously by blocking generation of ID{1428929=reactive oxygen species} in susceptible plants and reducing ID{4000000,4003443=oxidative damage} generated in response to ID{1221537=catechin}

VPmod ID{1241555=oxalate} & block susceptible plants ID{1428929=reactive oxygen species} generation

VPmod ID{1241555=oxalate} & reduce ID{4000000, 4003443=oxidative damage}

NPRel ID{1221537=catechin} response generate ID{4000000,4003443=oxidative damage}

Here, we report an analysis of the diverse and specific ID{1000000=flavonoids} that accumulate during ID{4000000,4005647=seed development} and maturation in wild types and mutants.

NPmod diverse and specific ID{1000000=flavonoids} analysis & accumulate maturation

NPmod diverse and specific ID{1000000=flavonoids} analysis & accumulate ID{4000000,4005647=seed development}

The RING domain of ID{836616=CIP8} is required and is sufficient for ID{12104842=ubiquitin ligase activity}

Main ID{12104842=ubiquitin ligase activity} & require ID{836616=CIP8} RING domain.

Main ID{12104842=ubiquitin ligase activity} & sufficient ID{836616=CIP8} RING domain ID{817956=ettin (ett)} mutations have pleiotropic effects on *Arabidopsis* ID{4000000,4005228=flower development}, causing increases in perianth organ number, decreases in ID{4000000,4005025,4005713=stamen number and anther formation}, and apical-basal patterning defects in the gynoecium.

Main ID{817956=ettin (ett)} mutations & have *Arabidopsis* ID{4000000,4005228=flower development} pleiotropic effects

VPmod ID{817956=ettin (ett)} mutations & cause perianth organ number increases

VPmod ID{817956=ettin (ett)} mutations & cause ID{4000000,4005025,4005711=stamen number and anther formation} decreases

VPmod ID{817956=ettin (ett)} mutations & cause gynoecium apical-basal patterning defects ID{612917=AHP6}, an inhibitory pseudophosphotransfer protein, counteracts ID{1000000=cytokinin} signaling, allowing ID{4000000,4005608=protoxylem formation}.

Main ID{612917=AHP6} & counteract ID{1000000=cytokinin} signaling

VPmod ID{612917=AHP6} & allow ID{4000000, 4005608=protoxylem formation}

Mechanistically, we found that ID{1241555=oxalate} works exogenously by blocking generation of ID{1428929=reactive oxygen species} in susceptible plants and reducing ID{4000000,4003443=oxidative damage} generated in response to ID{1221537=catechin}.

VPmod ID{1241555=oxalate} & block susceptible plants ID{1428929=reactive oxygen species} generation

VPmod ID{1241555=oxalate} & reduce ID{4000000, 4003443=oxidative damage}

The ID{609348=MAT} region of *Ustilago hordei*, a bipolar barley pathogen, harbors distinct ID{4000000, 4003717=mating} functions (a and b loci).

Main *Ustilago hordei* ID{609348=MAT} region & harbor distinct ID{4000000,4003717=mating} functions (a and b loci)

The increase in ID{610266=DHAR} expression increased foliar and kernel ID{1336119=ascorbic acid} levels 2- to 4-fold and significantly increased the ID{1297509=ascorbate} redox state in both tobacco and maize.

Main ID{610266=DHAR} expression increase & increase kernel ID{1336119=ascorbic acid} levels 2- to 4-fold

Main ID{610266=DHAR} expression increase & increase both tobacco ID{1297509=ascorbate} redox state ID{1214008=Furan} induced ID{1408700=trifluorothymidine} resistance in mouse L5178Y lymphoma cells in the absence of S9, and ID{2000000,2000789=sister chromatid} exchanges and ID{2000000,2000802=chromosomal} aberrations in ID{11013387=Chinese hamster ovary cells}, with and without S9.

Main ID{1214008=Furan} & induce S 9 absence mouse L 5178 Y lymphoma cells ID{1408700=trifluorothymidine} resistance

Main ID{1214008=Furan} & induce ID{2000000, 2000789=sister chromatid} exchanges

Main ID{1214008=Furan} & induce ID{11013387=Chinese hamster ovary cells} ID{2000000, 2000802=chromosomal} aberrations This factor (ID{611069=GBF}) is distinct from the factor ID{612311=GT-1} which binds to adjacent GT boxes in the pea ID{611557=rbcS-3A} promoter.

Main This factor ID{611069=(GBF)} & distinct factor ID{612311=GT-1}

NPmod factor ID{612311=GT-1} & hind pea ID{611557=rbcS-3A} promoter adjacent GT boxes Site-directed ID{4000000,4106280=mutagenesis} of the ID{617923=PpLEA-1} promoter indicates that ID{1241341=ABA}-inducibility is mediated via an ID{612819=ACGT}-core motif similar to that seen in the ID{4000000,4005004=ABA response} elements of higher plant ID{1299198=LEA} genes.

Main ID{612819=ACGT}-core motif & mediate ID{1241341=ABA}-inducibility

NPmod ID{612819=ACGT}-core motif & seen higher plant ID{1299198=LEA} genes ID{4000000, 4005004=ABA response} elements ID{827230=CLA} significantly reduced antigen-induced ID{1338404=histamine} and ID{1421143=PGE} (2) release.

Main ID{827230=CLA} & reduce ID{1421143=PGE} (2) release

Main ID{827230=CLA} & reduce ID{1338404=histamine}

Together, these data suggest that the 120- and 160-kDa proteins are ID{608111=PSK-alpha} receptors that mediate the biological activities of ID{608111=PSK-alpha}.

NPmod ID{608111=PSK-alpha} receptors & mediate ID{1608111=PSK-alpha} biological activities It should now be understood that embodiments described herein convert natural language sentences into primitive sentences that are computer readable such that a computing device receiving an input of the natural language sentence can effectively and efficiently convert the natural language sentences to a form that is easily processed by the computing device for the purposes of extracting information therefrom. Such systems and methods described herein improve the functionality of the computing device because the conversion process from a natural language sentence to the computer readable format (i.e., a primitive sentence) does not require processing and data storage constraints typically attributed to other NLP systems and methods. For example, the systems and methods described herein do not require the processing power or data storage to construct and maintain a semantic tree. As such, the systems and methods described herein allow the computing device to operate more efficiently and in a more streamlined manner.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for converting a natural language sentence into a computer-readable primitive sentence, the method comprising:
    identifying, by a processing device, a verbal block in the natural language sentence;
    splitting, by the processing device, the natural language sentence into one or more logical clauses;
    determining, by the processing device, a type for each of the one or more logical clauses, wherein the type indicates whether each of the one or more logical clauses contains an ambiguous verbal block;
    disambiguating, by the processing device, the ambiguous verbal block within each of the one or more logical clauses, wherein each verbal block is considered independently of a noun phrase; and
    constructing, by the processing device, the computer-readable primitive sentence for each ambiguous verbal block by duplicating a shared noun phrase of the ambiguous verbal block,
    wherein the computer-readable primitive sentence improves a functioning of a computing device by not requiring voluminous storage space in allowing the computing device to process the natural language sentence to obtain information from the natural language sentence.

2. The method of claim 1, further comprising:
    extracting, by the processing device, the information from the computer-readable primitive sentence.

3. The method of claim 2, wherein extracting the information from the computer-readable primitive sentence comprises detecting sequences of words in the computer-readable primitive sentence using regular expression-like word patterns.

4. The method of claim 1, wherein determining the type comprises identifying the ambiguous verbal block by using a finite state automaton operating on syntactic categories of sentence lexemes.

5. The method of claim 4, wherein the finite state automaton is compiled from a set of regular expressions.

6. The method of claim 1, wherein each of the one or more logical clauses is a subordinate logical clause or a coordinate logical clause.

7. The method of claim 1, wherein each of the one or more logical clauses is one or more of a main clause, a which/that clause, an apposition clause, a V-complement clause, a prepositional modifier clause, an adverbial modifier clause, a conditional clause, a To-clause, an As-clause, a By-clause, and an ING-clause.

8. The method of claim 1, wherein disambiguating the ambiguous verbal block comprises:

examining, by the processing device, a first lexeme immediately preceding the ambiguous verbal block and a second lexeme immediately following the ambiguous verbal block;

matching, by the processing device, the first lexeme and the second lexeme to a rule to determine an ambiguous category; and replacing the ambiguous category with a non-ambiguous category.

9. The method of claim 1, wherein disambiguating the ambiguous verbal block comprises performing a global disambiguating task.

10. A method for extracting information from a natural language sentence, the method comprising:

converting, by a processing device, the natural language sentence into a computer readable primitive sentence by detecting one or more logical clauses in the natural language sentence, wherein the computer-readable primitive sentence improves a functioning of a computing device by not requiring voluminous storage space in allowing the computing device to process the natural language sentence to obtain information from the natural language sentence;

determining, by the processing device, a type for each of the one or more logical clauses, wherein the type indicates whether each of the one or more logical clauses contains an ambiguous verbal block; and extracting, by the processing device, information using from the computer-readable primitive sentence based on the type for each of the one or more logical clauses.

11. The method of claim 10, wherein determining the type comprises identifying the ambiguous verbal block by using a finite state automaton operating on syntactic categories of sentence lexemes.

12. The method of claim 11, wherein the finite state automaton is compiled from a set of regular expressions.

13. The method of claim 10, wherein extracting the information from the computer-readable primitive sentence comprises detecting sequences of words in the computer-readable primitive sentence using regular expression-like word patterns.

14. The method of claim 10, wherein each of the one or more logical clauses is a subordinate logical clause or a coordinate logical clause.

15. The method of claim 10, wherein each of the one or more logical clauses is one or more of a main clause, a which/that clause, an apposition clause, a V-complement clause, a prepositional modifier clause, an adverbial modifier clause, a conditional clause, a To-clause, an As-clause, a By-clause, and an ING-clause.

16. A system for converting a natural language sentence into a computer-readable primitive sentence, the system comprising:

a processing device; and a non-transitory, processor-readable storage medium comprising one or more programming instructions that, when executed, cause the processing device to:

identify a verbal block in the natural language sentence;

split the natural language sentence into one or more logical clauses;

determine a type for each of the one or more logical clauses, wherein the type indicates whether each of the one or more logical clauses contains an ambiguous verbal block;

disambiguate the ambiguous verbal block within each of the one or more logical clauses, wherein each verbal block is considered independently of a noun phrase; and construct the computer-readable primitive sentence for each ambiguous verbal block by duplicating a shared noun phrase of the ambiguous verbal block, wherein the computer-readable primitive sentence improves a functioning of a computing device by not requiring voluminous storage space in allowing the computing device to process the natural language sentence to obtain information from the natural language sentence.

17. The system of claim 16, wherein the non-transitory, processor-readable storage medium further comprises one or more programming instructions that, when executed, cause the processing device to:

extract the information from the computer-readable primitive sentence.

18. The system of claim 17, wherein the one or more programming instructions that, when executed, cause the processing device to extract the information from the computer-readable primitive sentence further comprise causing the processing device to detect sequences of words in the computer-readable primitive sentence using regular expression-like word patterns.

19. The system of claim 16, wherein the one or more programming instructions that, when executed, cause the processing device to determine the type further comprise causing the processing device to identify the ambiguous verbal block by using a finite state automaton operating on syntactic categories of sentence lexemes.

20. The system of claim 16, wherein the one or more programming instructions that, when executed, cause the processing device to disambiguate the ambiguous verbal block further comprise causing the processing device to perform at least one of a local disambiguating task and a global disambiguating task.

* * * * *